I. S. SPENCER.
Thrashing Machine.
No. 2,141. Reissued Jan. 2, 1866.
Fig. 1,
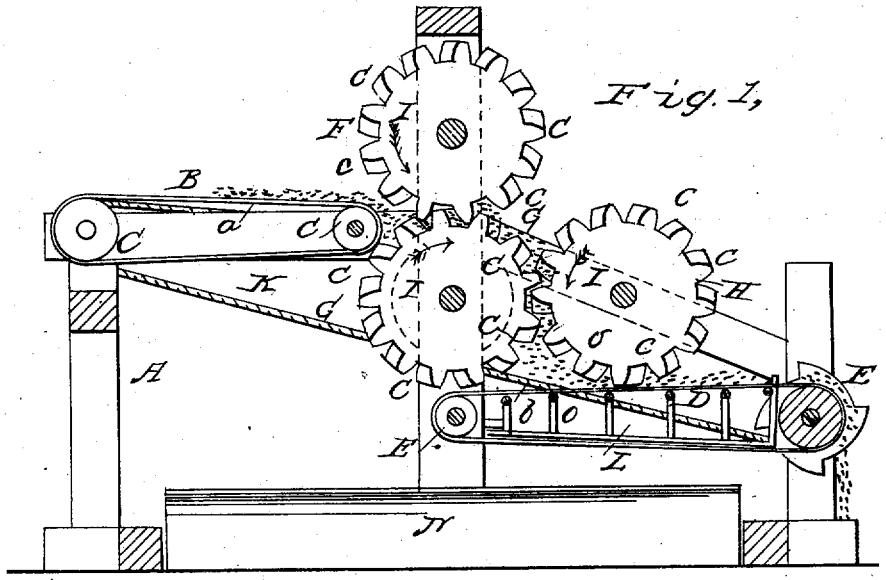
Fig. 2,
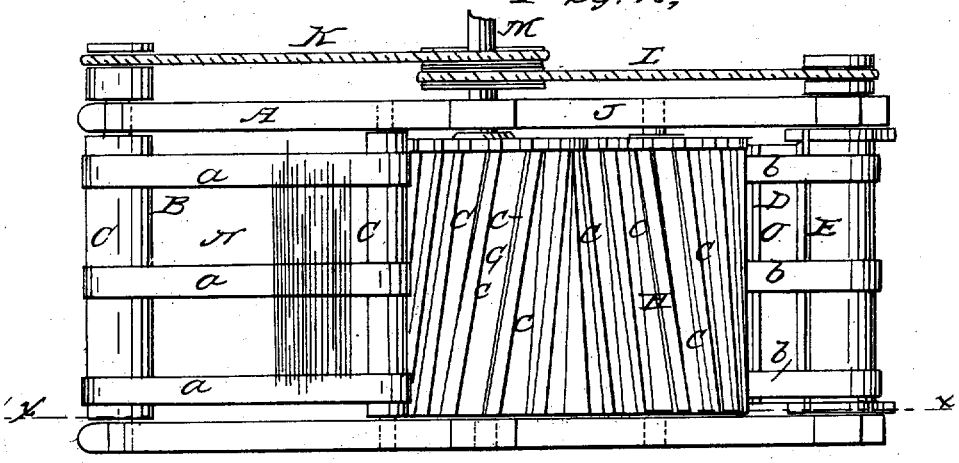
N. PETERS, Photo-Lithographer, Washington, D.C.

UNITED STATES PATENT OFFICE.

NELSON PALMER, OF HUDSON, NEW YORK, ASSIGNEE OF ISAAC S. SPENCER.

IMPROVEMENT IN THRASHING-MACHINES.

Specification forming part of Letters Patent No. 15,786, dated September 23, 1856; Reissue No. 2,141, dated January 2, 1866.

*To all whom it may concern:*

Be it known that ISAAC S. SPENCER, of Guilford, in the county of New Haven and State of Connecticut, invented a new and Improved Grain-Thrashing Machine; and I do hereby declare that the following is a full, clear, and exact description of the same, reference being had to the annexed drawings, making a part of this specification, in which—

Figure 1 is a longitudinal vertical section of the improvement, *x x*, Fig. 2, showing the plane of section. Fig. 2 is a plan or top view of the same, the stop-cylinder being removed.

Similar letters of reference indicate corresponding parts in the two figures.

This invention consists in the employment or use of thrashing-cylinders provided with ribs or flanges on their peripheries, said ribs or flanges being placed obliquely or angularly with the axes of the rollers, as will be hereinafter fully shown and described, whereby the grain is thrashed from the straw in a perfect manner, and without injuring or breaking the straw.

To enable others skilled in the art to fully understand and construct the invention, I will proceed to describe it.

A represents a framing, which may be constructed in any proper manner to support the working parts.

B represents an endless apron, which may be constructed of a series of belts, *a*, placed around rollers C C at the front end of the framing; and D represents an endless apron formed of belts *b*, which pass over rollers E E at the back part of the framing, the apron D being considerably lower than the apron B, as plainly shown in Fig. 1.

F G H represent three cylinders, which are placed transversely in the framing A. Two of these cylinders, F G, are placed one above the other, and the other cylinder, H, is placed on a horizontal line with the lower cylinder, G. The two cylinders F G have each a toothed wheel, I, on one end, said wheels gearing into each other, and the cylinder H has a toothed wheel, J, at one end, which gears into the wheel of the cylinder G, as shown clearly in Fig. 1.

On the peripheries of the three cylinders F G H there are placed ribs or flanges *c*. These ribs or flanges are placed obliquely or angularly with the axes of the cylinders, as shown in Fig. 2. These ribs or flanges gear into each other, and the ribs or flanges of one cylinder are in a reverse position to those of the adjoining one, (see Fig. 2,) so that the ribs or flanges of the three cylinders will form a perfect bearing, or be allowed to gear into each other as the cylinders rotate. For instance, the cylinder G (see Fig. 2) has its ribs or flanges in a reverse position to those on cylinder H, and the ribs on the latter cylinder correspond in position to those on roller F. The two endless aprons B D are driven by bands K L from a pulley, M, on the axis of the cylinder G.

The grain to be thrashed is placed transversely on the apron B, and is fed by said apron between the cylinders F G, and passes from between said cylinders down between the cylinders G H, and the straw is discharged off the end of the apron D, the grain being thrashed from the straw in a perfect manner, and without breaking the straw, as the ribs pass over each other similar to a pair of shears, and detach the grain from the straw. The grain falls upon an inclined bottom, N, and collects at one side of the bottom of the framing A. A proper shake-screen, O, is placed underneath the apron D.

The above invention is a decided improvement upon the machines in use, in which the ribs are placed parallel with the axes of the cylinders, as the straw is preserved in a perfect state equally as well as the straw from which the grain is thrashed by the hand-flail. By the ordinary machines the straw is completely broken. It is not confined to any precise angle of the ribs or flanges *c*, nor to the precise form, as they may be either straight, spiral, oblique, or angular.

Having thus described this invention, what I claim as new, and desire to secure by Letters Patent, is—

1. The endless feeding belt or apron B, in combination with the thrashing-cylinder F, as and for the purpose specified.

2. Two or more thrashing-cylinders with the straight, spiral, oblique, or angular corrugations working in concert, as specified.

In testimony whereof I have signed my name to this specification before two subscribing witnesses.

NELSON PALMER.

Witnesses:

G. C. HUMPHRIES,

D. P. HOLLOWAY.